(No Model.) 2 Sheets—Sheet 1.

W. B. TRAYLOR.
COTTON SEED MILL.

No. 400,373. Patented Mar. 26, 1889.

Witnesses:
Edm. P. Ellis
L. L. Burket

Inventor:
W. B. Traylor,
per
F. A. Lehmann,
atty (No Model.)   2 Sheets—Sheet 2.

W. B. TRAYLOR.
COTTON SEED MILL.

No. 400,373.   Patented Mar. 26, 1889.

Witnesses:
E. P. Ellis,
L. L. Burket.

Inventor:
W. B. Traylor
per J. A. Lehmann,
atty

UNITED STATES PATENT OFFICE.

WOODLIFFE B. TRAYLOR, OF ROCKY MOUNT, NORTH CAROLINA.

COTTON-SEED MILL.

SPECIFICATION forming part of Letters Patent No. 400,373, dated March 26, 1889.

Application filed August 8, 1888. Serial No. 282,205. (No model.)

*To all whom it may concern:*

Be it known that I, WOODLIFFE B. TRAYLOR, of Rocky Mount, in the county of Edgecomb and State of North Carolina, have invented certain new and useful Improvements in Cotton-Seed Mills; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-seed mills.

The object of my invention is to produce a mill which, while it is intended especially for cutting up or reducing cotton-seed so as to adapt it for use as a fertilizer, can be used in the reduction of corn for hominy, and which mill is capable of adjustment in such a manner that the cotton-seed may either be cut or reduced, or simply hulled, as may be desired.

Figure 1:
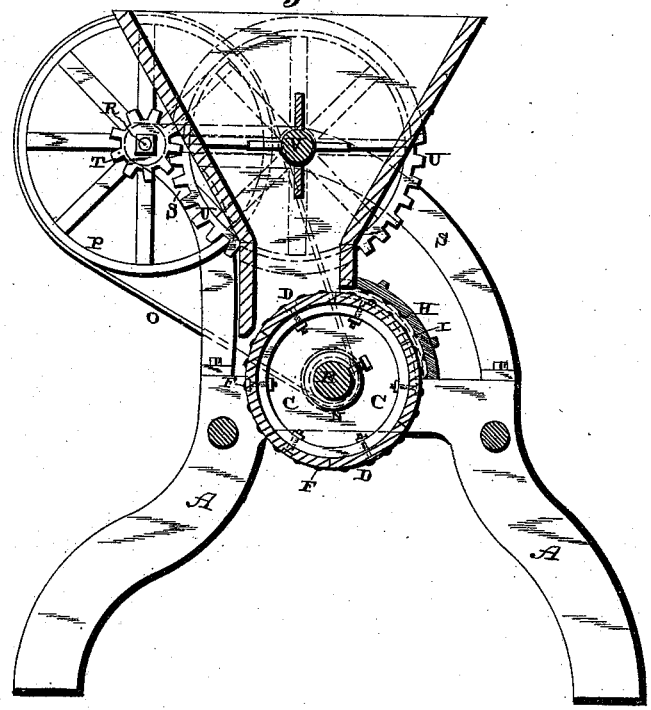
Figure 2:
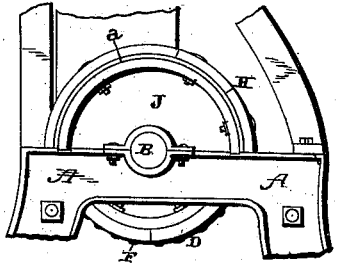
Figures 3, 4:
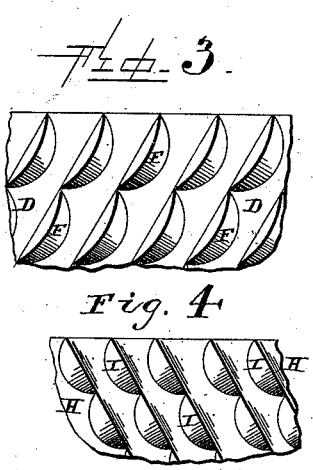

Figure 1 is a vertical cross-section of a machine which embodies my invention. Fig. 2 is a detail view of one of the boxes. Figs. 3 and 4 are detached perspectives of a portion of the cylinder and a portion of one of the concaves, respectively, showing the construction of the teeth used thereon.

A represents a suitable frame-work, of any desired construction, and in which the driving-shaft B is journaled. Secured to this driving-shaft B, by means of set-screws or other suitable devices, are the flanges or collars C, to the outer edges of which are secured a number of curved plates, D, having cutting, grinding, or reducing teeth F formed upon their outer sides. There may be any desired number of these plates, which, when put together, form a grinding or reducing cylinder, as shown. This cylinder is formed of a number of plates, so that in case any one of them should become injured or broken it can readily be removed and replaced by another, and thus avoid the expense of having to replace the whole cylinder. The teeth F upon the outer sides of the plates are placed in a continuous spiral around the side of the cylinder, and each tooth is entirely separate and distinct from the others. The outer or cutting edge of each tooth is made rounding, and upon one side the tooth has a vertical edge, while upon the other side the surface of the tooth is beveled gradually away, as shown. The sharp outer edge of each tooth formed by the vertical side forms the cutting-edge for reducing the seed, and the spaces between the ends of the teeth are just sufficient to allow the cut or broken portions of the seed to pass through into the circular groove or channel back of them. The teeth F upon the cylinder all extend in one direction, as shown, and these teeth act in conjunction with similarly-shaped teeth I, formed upon the inner sides of the concave plates H, which are secured to the upper half of the boxes J, in which the shaft B is journaled. The outer surfaces of the boxes J are formed upon a circle of which the center of the shaft forms the center. As the plates D which form the cylinder are also formed upon this circle, the teeth F and I, which are placed in reverse positions, as shown in Fig. 2, are made to just meet and cut any seed which may be dropped between them. There will be any number of the plates H, which can also be removed and replaced at will in case any one of them should become broken or injured by any foreign substance which may be fed into the hopper with the seed. Between the outer edge of the upper portion of the boxes J and the inner ends of the concave plates H are placed leather washers *a*, of any desired thickness or number, according to the distance it is desired to separate the cutting-edges of the teeth F and I from each other. If it be desired to reduce the cotton-seed so as to adapt it to be used as a fertilizer, the edges of the teeth will be made to approach each other very closely; but if it be simply desired to hull the cotton-seed then washers will be placed between the boxes and the plates H, and thus separate the teeth a greater distance apart. The cutting-edges of the teeth being separated from each other a suitable distance, when the cotton-seeds are dropped between them the cutting-edges of the teeth press the seed from opposite sides and simply break the hull without reducing the kernel. The teeth F and I being set in opposite directions to each other as shown in Fig. 2, the cut seed is forced along into the channeled grooves between the rows of teeth, and the cylinder is thus made self-cleaning and prevented from clogging or gumming, as would otherwise be the case.

Heretofore in mills intended for the reduction of cotton-seed for fertilizing purposes the great trouble has been to prevent the sides of the cylinder from becoming so gummed as to stop the operation of the mill. Where the teeth are simply arranged spirally, they break or crush the seed; but they are not made self-cleaning, and hence the oil in the seed soon gums upon the teeth, and thus causes the teeth to become so sticky that the mill ceases to operate. This difficulty I have overcome by making the teeth rounding upon their cutting-edges, separating them far enough to allow the cut or reduced portions of the seed to pass between them, and then placing the teeth upon the cylinder at an angle to those upon the concaved plates. By making spaces between the ends of the teeth, as shown, the cut or broken seeds are allowed to pass downward and out of the mill, whereas if there were no such spaces the seed would be constantly forced toward one end of the hopper, and thus create a friction upon the parts, which would not only eventually break the mill, but greatly retard its operation.

Secured upon one end of the shaft B is a small driving-pulley, N, over which passes a driving-belt, O, up over a large pulley, P, which is secured to the shaft R, which is journaled in the bracket S, and which has upon its other end the pinion T. This pinion T meshes with the large spur-wheel U, placed upon the end of the stirrer-shaft V, which extends through the hopper W. This stirrer prevents the seed from becoming clogged in the hopper and forces it down between the cylinder and the concave.

Although this mill is especially adapted and intended to reduce cotton-seed so as to adapt it to be used as a fertilizer, it can be used as a hominy-mill for stock purposes.

Having thus described my invention, I claim—

In a cotton-seed mill, the combination of a revolving cylinder provided with teeth F, arranged in spirals and slightly separated from each other, each tooth being provided with a cutting-edge and a vertical and an inclined side, with a concave also provided with teeth F, arranged in spirals, but extending in an opposite direction from those on the cylinder, substantially as shown.

In testimony whereof I affix my signature in presence of two witnesses.

W. B. TRAYLOR.

Witnesses:
F. A. LEHMANN,
OCTAVIUS KNIGHT.